United States Patent [19]

Jubran et al.

[11] Patent Number: 5,072,514
[45] Date of Patent: Dec. 17, 1991

[54] ROUND SCRAPER TOOL

[75] Inventors: William Jubran, Kfar Meiliya, Israel; Andre Carossino, Louveciennes, France

[73] Assignee: Vargus Ltd., Nahariya, Israel

[21] Appl. No.: 576,815

[22] Filed: Sep. 4, 1990

[30] Foreign Application Priority Data

Sep. 8, 1989 [IL] Israel ........................................ 91569

[51] Int. Cl.$^5$ ................................................. B26B 1/00
[52] U.S. Cl. ........................................ 30/169; 30/174; 30/317; 409/140; 409/299; 408/81; 408/211
[58] Field of Search .......................... 30/169, 174, 317; 15/236.01, 236.1; 407/1, 64, 65; 408/80, 81, 83, 211; 409/140, 299

[56] References Cited

U.S. PATENT DOCUMENTS

| | | | |
|---|---|---|---|
| Re. 32,141 | 5/1986 | Cosner | 15/236.01 |
| 843,344 | 2/1907 | Linderman | 69/20 |
| 4,739,687 | 4/1988 | Wanner et al. | 83/689 |

*Primary Examiner*—Mark Rosenbaum
*Assistant Examiner*—Allan M. Schrock
*Attorney, Agent, or Firm*—Benjamin J. Barish

[57] ABSTRACT

A scraper tool particularly useful for hand deburring internal rounded corners, holes an concave surfaces includes a scraper blade integrally formed with a front part having a scraping edge, and a back part joined to a shank at the back end fixed to the handle. The front face of the front part is of circular configuration and is cut at an oblique angle to the plane passing perpendicularly to the scraper blade to define a continuous oblong scraping edge.

17 Claims, 1 Drawing Sheet

ROUND SCRAPER TOOL

RELATED APPLICATIONS

The present application is related to our application Ser. No. 07/576,816 for Triangular Scraper Tool, and our application Ser. No. 07/576,868 for Flat Scraper Tool, both filed the same date as the present application.

FIELD AND BACKGROUND OF THE INVENTION

The present invention relates to scraper tools such as are used for deburring holes or other surface in workpieces.

After a workpiece is machined, drilled or grooved, it is frequently necessary to perform a deburring operation in order to remove burrs and to smoothen its surface. A number of hand deburring tools have been developed for this purpose, but the known tools are generally not efficiently applicable for deburring many different types of machined surfaces.

OBJECTS AND BRIEF SUMMARY OF THE INVENTION

An object of the present invention is to provide a scraper tool which can be efficiently used for deburring various types of curved machined surfaces.

According to the present invention, there is provided a scraper tool particularly useful for hand deburring curved surfaces, particularly internal rounded corners, holes and concave surfaces, comprising a scraper blade at the front end of the tool joined to a handle at the back end of the tool. The scraper blade is integrally formed with a front part having a scraping edge, and a back part joined to a shank at the back end fixed to the handle. The front face of the front part is of solid circular configuration and is cut at oblique angle to the plane passing perpendicularly to the scraper blade to define a solid oblong face having a continuous oblong scraping edge.

According to further features in the described embodiment, the front part of the scraper blade is of conical configuration decreasing in diameter front the front face toward the back part; and the back part of the scraper blade is also of conical configuration but increasing in diameter towards the shank.

By this construction, simply grinding the oblique front face of the tool enables a wide range of diameters to be provided. Also, the continuous oblong scraping edge defined between the oblique front face and the side wall of the scraper blade may be applied at a wide range of cutting angles, both positive and negative, according to the manner of holding the scraper tool. This permits the tool to be used for manually deburring and smoothing a wide variety of curved surfaces, including internal rounded corners, holes and concave surfaces, and with many different materials, including steel, aluminum, cast iron, brass, plastics, etc.

Further features and advantages of the invention will be apparent from the description below.

BRIEF DESCRIPTION OF THE DRAWINGS

The invention is herein described, by way of example only, with reference to the accompanying drawing, wherein.

DESCRIPTION OF A PREFERRED EMBODIMENT

Figure 1:
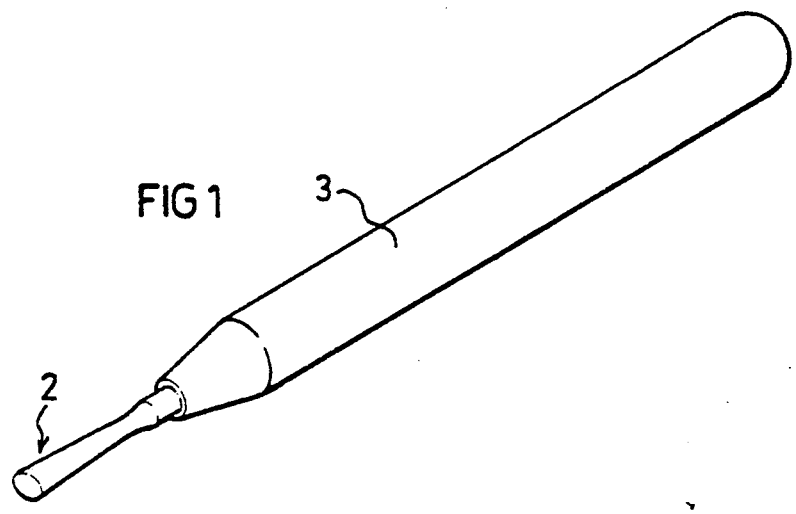
FIG. 1 is three-dimensional view illustrating one form of scraper tool constructed in accordance with the present invention.

The scraper tool illustrated in the drawings is particularly useful for hand-deburring various types of curved surfaces, including internal rounded corners, holes or concave surfaces. It is constituted of two main elements, namely a scraper blade 2 at the front end of the tool joined to a handle 3 at the back end. The scraper blade 2 is preferably made of solid hard steel, whereas the handle 3 is preferably made of aluminum.

Figure 2:
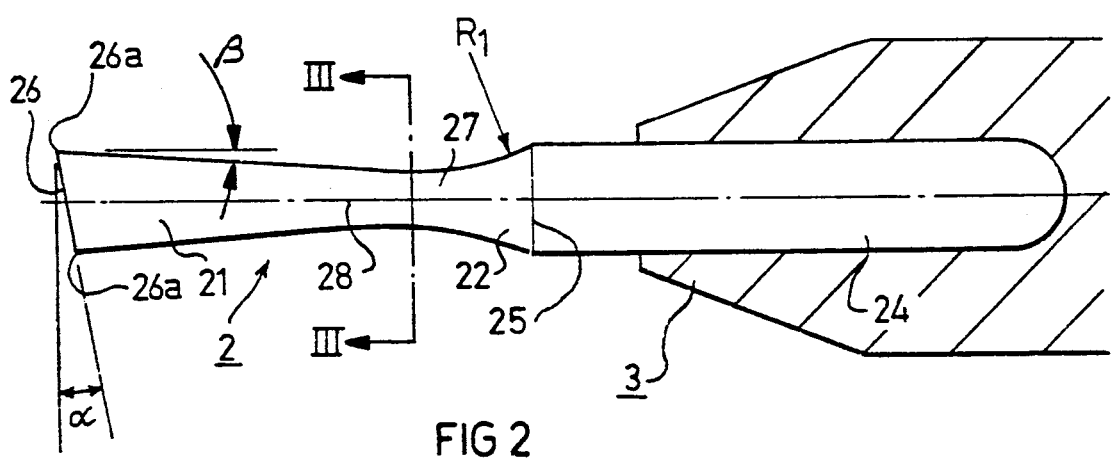
FIG. 2 is an enlarged side-elevational view illustrating particularly the scraper blade in the tool of FIG. 1.
Figure 3:
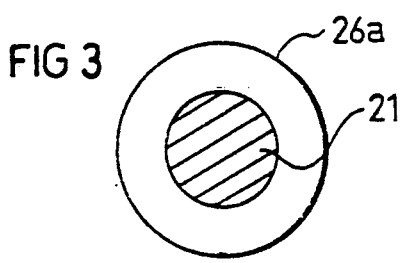
FIG. 3 is a sectional view along line III—III of FIG. 2.
Figure 4:
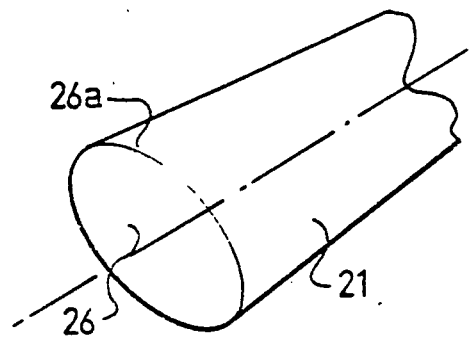
FIG. 4 is an enlarged frangmentary view of the front face.

As shown particularly in FIGS. 2 and 3, the scraper blade 2 is integrally formed with a front part 21 and a back part 22, both of a circular cross-section. The back part is joined to a cylindrical shank 24 along a circular juncture line 25. The front face 26 of the front part 21 is cut at a bias to define an oblique angle ($\alpha$) to a plane passing perpendicularly through the scraper blade 21. Accordingly, a solid oblique face 26 is thus formed having a continuous sharp edge 26a of elliptical configuration. Angle $\alpha$ is between 5-45 degrees, preferably about 10 degrees.

The front part 21 of the scraper blade is of conical configuration, decreasing in diameter from the front face 26 towards the back part 22; and the back part 22 of the scraper blade is also of conical configuration, but increasing in diameter from the front part to the shank 24. A smooth juncture is formed between the two parts 21 and 22 is indicated by broken line 27.

The front part 21 of the scraper blade 2 decreases in diameter from the outer face 26 to the juncture line 27 at a substantially uniform rate so that the outer face of the front part 21 forms a constant angle ($\beta$) with respect to the longitudinal axis of the scraper blade 2. Angle $\beta$ is preferably within the range of 2-10 degrees, an angle of 4 degrees being found particularly effective.

The outer face of the back conical part 22 is not straight but rather is curved, preferably with a radius of curvature of between 5-20 mm, a radius of curvature of approximately 10 mm being most preferred.

The front part 21 of the scraper blade has a diameter of 2.5-3.5 mm at its front face 26, and decreases in diameter at a uniform rate to 1.5-1.8 mm at the juncture line 27 with the back part 22. The back part 22, of the same diameter as the front part 21 at the juncture line 27, increases at a non-linear rate to that of the shank 24 to which it is joined at the juncture line 25. The diameter of the shank is preferably 3-3.5 mm.

In the preferred embodiment illustrated in the drawings, the length of the front part 21 is 10 mm; the length of the back part 22 is 4 mm; the length of shank 24 is 16 mm; the diameter of the front part at the front face 26 is 3.0 mm; the diameter at the juncture line 25 with the back part 22 is about 1.7 mm; and the diameter of the back part 22 at juncture line 25 with shank 24 is about 3.2 mm.

The scraper tool illustrated in the drawings may be used for deburring and smoothing wide variety of curved machined surfaces, such as internal rounded corners, holes and concave surfaces. Thus, the tool may be manually held by the handle with the cutting edge 26A defined by the obliquely-cut outer face 26 at a wide variety of cutting angles, both positive and negative, with respect to the machined surface being deburred or smoothed. The illustrated tool may also be used with respect to a wide variety of materials, including steel, aluminum, cast iron, brass, plastics, etc.

While the invention has been described with respect to one preferred embodiment, it would be appreciated that many variations, modifications and other applications of the invention may be made.

What is claimed is:

1. A scraper tool particularly useful for hand deburring internal rounded corners, holes and concave surfaces, comprising:

a scraper blade at the front end of the tool joined to a handle at the back end of the tool;

said scraper blade being integrally formed with a front part having a scraping edge, and a back part joined to a shank at the back end fixed to said handle;

the front face of the front part being of solid configuration and cut at an oblique angle to the plane passing perpendicularly to the scraper blade to define a solid planar oblong face having a continuous oblong scraping edge.

2. The scraper tool according to claim 1, wherein said oblique angle is 5-45 degrees.

3. The scraper tool according to claim 2, wherein said oblique angle is approximately 10 degrees.

4. The scraper tool according to claim 1, wherein the front part the scraper blade is of conical configuration decreasing in diameter from the front face towards the back part.

5. The scraper tool according to claim 4, wherein the back part of the scraper blade is also of conical configuration but increasing in diameter towards the shank.

6. The scraper tool according to claim 5, wherein the front part of the scraper blade forms an angle of 2-10 degrees with respect to the longitudinal axis of the scraper blade.

7. The scraper tool according to claim 6, wherein the front part of the scraper blade forms an angle of approximately 4 degrees with respect to the longitudinal axis of the scraper blade.

8. The scraper tool according to claim 5, wherein the radius of curvature of the back part of the scraper blade is 5-20 mm.

9. The scraper tool according to claim 8, wherein the radius of curvature of the back part of the scraper blade is approximately 10 mm.

10. The scraper tool according to claim 1, wherein the front part of the scraper blade has a diameter of 2.5-3.5 mm at its front face and decreases to a diameter of 1.5-1.8 mm at its juncture with the back part.

11. The scraper tool according to claim 10, wherein the front part of the scraper blade has a diameter of approximately 3.0 mm at its front face and decreases to a diameter of approximately 1.7 mm at its juncture with the back part.

12. The scraper tool according to claim 1, wherein the length of the front part is 8-12 mm, the length of the back part is 2-6 mm, and the length of the shank is 12-24 mm.

13. The scraper tool according to claim 12, wherein the length of the front part is approximately 10 mm, the length of the back part is approximately 4 mm, and the length of the shank if approximately 16 mm.

14. The scraper tool according to claim 12, wherein the diameter of the shank is 3-3.5 mm.

15. The scraper tool according to claim 14, wherein the diameter of the shank is approximately 3.2 mm.

16. The scraper tool according to claim 1, wherein said scraper blade is of a solid construction and is made of hard steel.

17. The scraper tool according to claim 1, wherein said handle is made of aluminum.

* * * * *